United States Patent Office 3,041,239
Patented June 26, 1962

3,041,239
STABLE AQUEOUS SALICYLAMIDE COMPOSITION AND METHOD OF PREPARING SAME
Wilson Nashed, North Brunswick, N.J., assignor to Johnson & Johnson, a corporation of New Jersey
No Drawing. Filed May 28, 1959, Ser. No. 816,386
7 Claims. (Cl. 167—65)

This application is a continuation-in-part of application Serial Number 674,570, issued as U.S. Patent No. 2,904,469 on September 15, 1959.

This invention relates to stable aqueous suspensions of solid salicylamide and to methods for the preparation thereof. More particularly, it relates to such suspensions wherein the particle size of the salicylamide is such that substantially all of its passes through a #60 mesh sieve and preferably through a #100 mesh sieve and a major proportion thereof is retained by a #325 mesh sieve.

In the oral administration of salicylamide medication, a formulation containing finely divided salicylamide, polyvinylpyrrolidone and an aqueous sugar syrup, prepared in accordance with the above indicated parent application, has enjoyed substantial commercial success. However, in some instances, it has a disadvantageous burning aftertaste; and the art is confronted by the problem of providing desirable suspensions of this type which are free from this disadvantage.

The discoveries associated with the invention and relating to solutions of the above problems, and the objects achieved in accordance with the invention as set forth herein include: the provision of a suspension of solid salicylamide substantially free from burning aftertaste; the provision of a method for the preparation of a stable aqueous suspension containing 2 to 15 percent by weight of solid salicylamide and a thickening agent in an aqueous vehicle, which method comprises preparing an aqueous solution of the agent and adding a paste of the salicylamide in aqueous polyvinylpyrrolidone and thoroughly mixing with an aqueous sugar solution to give a final suspension having a specific gravity in the range of 1.335 to 1.340, the concentration of the polyvinylpyrrolidone being at least 0.0149% based on the weight of the final suspension, said salicylamide being of a particle size such that substantially all of it passes through a #100 mesh sieve and at least 50% thereof is retained on a #325 mesh sieve, the amount of the thickening agent being such as to provide a fluid having a viscosity in the range of 300 to 18,300 cps.; the provision of a method for the preparation of stable aqueous suspension containing 2 to 15 percent by weight of solid salicylamide and 0.1 to 1% by weight of magnesium aluminum silicate in an aqueous vehicle, which method comprises preparing an aqueous solution of the silicate and adding a paste of the salicylamide in aqueous polyvinylpyrrolidone and thoroughly mixing with an aqueous sugar solution to give a final suspension having a specific gravity in the range of 1.335 to 1.340, the concentration of the polyvinylpyrrolidone being at least 0.0149% based on the weight of the final suspension, said salicylamide being of a particle size such that substantially all of it passes through a #100 mesh sieve and at least 50% thereof is retained on a #325 mesh sieve; the provision of such a method wherein the polyvinylpyrrolidone is of an average molecular weight of about 40,000 and the sugar solution contains sucrose and sorbitol in a ratio of 3 parts of the former to 1 part of the latter by weight; the provision of a stable aqueous suspension of 2 to 15 percent by weight of solid salicylamide in an aqueous sugar solution, which solution has a specific gravity in the range of 1.335 to 1.340, which suspension contains at least 0.0149% of polyvinylpyrrolidone based on the weight of the final suspension, said salicylamide being of a particle size such that substantially all of it passes through a #100 mesh sieve and at least 50% thereof is retained on a #325 mesh sieve, the amount of the thickening agent being such as to provide a fluid having a viscosity in the range of 300 to 18,300 cps.; the provision of a stable aqueous suspension of solid salicylamide and 0.1 to 1% by weight of magnesium aluminum silicate in an aqueous sugar solution, which solution has a specific gravity in the range of 1.335 to 1.340, which suspension contains at least 0.0149% of polyvinylpyrrolidone based on the weight of the final suspension, said salicylamide being of a particle size such that substantially all of it passes through a #100 mesh sieve and a major proportion thereof is retained on a #325 mesh sieve; the provision of such a suspension containing about 5% of the salicylamide; and other objects which will be apparent as details or embodiments of the invention are described hereinafter.

In order to facilitate a clear understanding of the invention, the following preferred specific embodiments are described in detail.

EXAMPLE I

A solution is prepared having the following composition (percent is by weight of the solution):

| | Percent |
|---|---|
| Salicylamide | 4.9390 |
| Polyvinylpyrrolidone | 0.0299 |
| Magnesium aluminum silicate | 0.2054 |
| 70% sorbitol (aq.) | 23.2548 |
| Sucrose | 49.9586 |
| Water | To 100.0000 |

This formulation is prepared by forming a heated mixture or solution of the magnesium aluminum silicate and most of the water, gradually adding most of the sucrose and sorbitol, adding thereto the salicylamide and the polyvinylpyrrolidone and blending with the remainder of the water with thorough mixing or kneading.

In this formulation the particle size of the salicylamide is such that substantially all of it passes through a #100 mesh sieve and only about 38% thereof passes through a #325 mesh sieve (U.S. Sieve series). This composition when administered orally, is found to be substantially free from the undesirable burning aftertaste. If desired, flavoring and coloring agents may be added.

Determination of Mesh Size

A saturated salicylamide solution is prepared by mixing 2000 ml. of distilled water, 0.6 gm. of polyvinylpyrrolidone and 50 gm. of salicylamide with rapid agitation for ½ hour. The mixture is filtered through #3 filter paper and the filtrate is collected and used as the washing solution for the evaluation.

Mix 50 gm. of salicylamide to be evaluated and 500 ml. of the saturated salicylamide solution with rapid agitation for 5 minutes. The mixture is filtered through a tared 100 mesh screen. The residue on the screen is washed several times with polyvinylpyrrolidone-salicylamide solution, above, using a rubber spatula until a clear filtrate is obtained. The residual salicylamide on the screen is dried at 120° F. overnight or about 15 hours, cooled and weighed.

Percent salicylamide retained on 100 mesh screen equals two times the residual weight on 100 mesh screen.

A saturated salicylamide solution is prepared by mixing 2000 ml. of distilled water, 0.6 gm. of polyvinylpyrrolidone and 50 gm. of salicylamide with rapid agitation for ½ hour. The mixture is filtered through #3 filter paper and the filtrate is collected and used as the washing solution for the evaluation.

Mix 50 gm. of salicylamide to be evaluated and 500 ml. of the saturated salicylamide solution with rapid agitation for 5 minutes. The mixture is filtered through a tared #325 mesh screen. The residue on the screen is washed several times with polyvinylpyrrolidone-salicylamide solution, above using a rubber spatula until a clear filtrate is obtained. The residual salicylamide on the screen is dried at 120° F. overnight or about 15 hours, cooled and weighed.

Percent salicylamide passed through #325 mesh screen equals 100 minus 2 times residual weight on #325 mesh screen.

COMPARATIVE EXAMPLE A

Example 1 is repeated except that the salicylamide used is one of a particle size such that all of it passes through the #325 mesh sieve. Upon test, this is found to have the undesirable burning aftertaste.

COMPARATIVE EXAMPLE B

Example 1 is repeated except that the salicylamide used is one of a particle size such that it is all retained on a #100 mesh sieve. Upon test, this is found to have an undesirable gritty taste or texture.

EXAMPLE II

Example 1 is repeated except that the particle size of the salicylamide is such that it all passes through a #100 mesh sieve and is all retained on a #325 mesh sieve. Upon test the resultant product is found to be free of the undesirable burning aftertaste.

All of the foregoing formulations are satisfactory from the viewpoint of stability (no separation of the salicylamide) when tested by allowing the same to stand for about 15 hours or more, and then testing the product for homogeneity.

The formulation containing about 0.2% of the magnesium aluminum silicate is easily reconstituted by shaking (if it has been standing for a sufficient time to deposit the salicylamide as a sediment), whereas a similarly settled formulation which does not contain the magnesium aluminum silicate is not readily dispersed or reconstituted on shaking.

Comparable results to the foregoing Examples 1 and 2 may be obtained with various modifications thereof, including the following. The concentration of the salicylamide in the final composition may be in the range of 2 to 15 percent by weight, preferably 4 to 5 percent. The particle size of the salicylamide in the final composition is such that substantially all of it passes through a #100 mesh sieve and at least 50% thereof is retained on a #325 mesh sieve; i.e., the particle size or diameter thereof may average 20 microns to 40 microns (as determined by known methods, e.g., a subsieve analyzer).

It is preferred that the viscosity of the formulation be in the range of 500 to 1000 cps. (centipoises), although viscosities in the range of about 300 to 18,300 cps. are operative (rotating spindle viscometer such as the Brookfield Viscometer, using #2 spindle, 30 r.p.m. at 25° C.; Instructions, Brookfield Synchro-Lectric Viscometer, published by the Brookfield Engineering Laboratories, Inc., Stoughton, Massachusetts, Serial Number 8667, and also their Data Sheet #081–a).

The viscosity of the formulation is dependent on the concentration of the magnesium aluminum silicate and generally this may be in the range of 0.1 to 1%, preferably 0.2 to 0.5% by weight based on the weight of the formulation. In addition to controlling the viscosity, this critical amount of magnesium aluminum silicate controls or retards the sedimentation rate of the salicylamide. In addition, it appears to aid in reducing the undesirable burning aftertaste.

A high viscosity carboxymethyl cellulose or the like thickening agent may be used instead of the silicate; if desired, in an amount in the range of 0.02 to 0.3, preferably 0.1%.

The molecular weight of the polyvinylpyrrolidone may be in the range of about 20,000 to about 80,000 desirably 30,000 to 50,000, preferably 40,000, average. The concentration thereof in the final composition is at least about 0.02% weight/volume (i.e., 0.0149% by weight). The maximum concentration is the solubility limit thereof in the final composition; however, for practical purposes, one percent is the upper limit. Instead of the sucrose in the mixture, other sugars may be used, including hydrolyzed sucrose, glucose, fructose, or mixtures thereof. Various proportions of sugar or sugars may be used with sorbitol, providing the desired specific gravity is maintained.

If desired, there may be included in the mixture a small amount of sodium benzoate or the like preservative, as well as coloring or flavoring materials. These do not interfere with or cause any harmful effect on the stability of the resulting composition. It is desirable to use relatively ion-free water.

In making up the preparation, the silicate (thickening agent) may be mixed with the water using an efficient propeller-type mixer and the sorbitol and sucrose added thereto, together with the sodium benzoate, if desired. The mixture may be heated, e.g., up to about 175 to 200° F., in order to obtain complete solution. The specific gravity of the resulting solution of silicate and sugar should be in the range of 1.352 to 1.356, and if necessary, it may be adjusted by adding either water or sugar.

The polyvinylpyrrolidone may be dissolved in water, using about 5 to 10 parts by weight of the water per part of the polyvinylpyrrolidone. The resulting polyvinylpyrrolidone solution may be mixed with a portion of the sugar solution, e.g., in the proportions of about 15 to 25 parts by weight of the sugar solution per part by weight of the polyvinylpyrrolidone solution, and these may be mixed with the salicylamide in an efficient mixer, preferably one provided with means for evacuating the mixing chamber.

Preferably, the salicylamide is added thereto gradually with relatively slow agitation, in a proportion such as about 0.5 part by weight of salicylamide per part by weight of the liquid mixture therein. The resulting mixture is agitated at high speed. Then the mixing chamber is evacuated, without agitation. After the vacuum has been brought up to about 27 to 28 inches of mercury, the agitation is started again, and the speed thereof gradually increased, and maintained at highest speed for a time to achieve thorough mixing, such as about ½ or 1 hour or more. Then the speed is gradually reduced, and finally the vacuum is decreased and the contents brought back to room pressure. If desired, a small amount of coloring matter and flavoring may be added thereto, e.g., as a solution in water.

The resulting mixture may be added to additional syrup, if desired, to give a final composition of the desired salicylamide concentration, and this may be achieved by mixing thoroughly with a paddle or propeller type mixer.

It may be desirable to check the salicylamide particle size distribution in the final composition, especially if "grinding" occurs during the mixing operations.

In view of the foregoing disclosures, variations or modifications thereof will be apparent, and it is intended to include within the invention all such variations and modifications except as do not come within the scope of the appended claims.

I claim:

1. A method for the preparation of a stable aqueous suspension containing 2 to 15 percent by weight of solid salicylamide and a thickening agent in an aqueous vehicle, which method comprises preparing an aqueous solution of the agent and adding a paste of the salicylamide in aqueous polyvinylpyrrolidone and thoroughly mixing with an aqueous sugar solution to give a final suspension having a specific gravity in the range of 1.335 to 1.340, the concentration of the polyvinylpyrrolidone being at least 0.0149% based on the weight of the final suspension, said salicylamide being of a particle size such that substantially all of it passes through a #100 mesh sieve and at least 50% thereof is retained on a #325 mesh sieve, the amount of the thickening agent being such as to provide a fluid having a viscosity in the range of 300 to 18,300 c.p.s.

2. A method for the preparation of stable aqueous suspension containing 2 to 15 percent by weight of solid salicylamide and 0.1 to 1% by weight of magnesium aluminum silicate in an aqueous vehicle, which method comprises preparing an aqueous solution of the silicate and adding a paste of the salicylamide in aqueous polyvinylpyrrolidone and thoroughly mixing with an aqueous sugar solution to give a final suspension having a specific gravity in the range of 1.335 to 1.340, the concentration of the polyvinylpyrrolidone being at least 0.0149% based on the weight of the final suspension, said salicylamide being of a particle size such that substantially all of it passes through a #100 mesh sieve and at least 50% thereof is retained on a #325 mesh sieve.

3. A method of claim 2 wherein the polyvinylpyrrolidone is of an average molecular weight of about 40,000 and the sugar solution contains sucrose and sorbitol in a ratio of 3 parts of the former to 1 part of the latter by weight.

4. A stable aqueous suspension of 2 to 15 percent by weight of solid salicylamide in an aqueous sugar solution, which solution has a specific gravity in the range of 1.335 to 1.340, which suspension contains at least 0.0149% of polyvinylpyrrolidone based on the weight of the final suspension, said salicylamide being of a particle size such that substantially all of its passes through a #100 mesh sieve and at least 50% thereof is retained on a #325 mesh sieve, the amount of the thickening agent being such as to provide a fluid having a viscosity in the range of 300 to 18,300 c.p.s.

5. A stable aqueous suspension of solid salicylamide and 0.1 to 1% by weight of magnesium aluminum silicate in an aqueous sugar solution, which solution has a specific gravity in the range of 1.335 to 1.340, which suspension contains at least 0.0149% of polyvinylpyrrolidone based on the weight of the final suspension, said salicylamide being of a particle size such that substantially all of it passes through a #100 mesh sieve and a major proportion thereof is retained on a #325 mesh sieve.

6. A suspension of claim 5 containing about 5% of the salicylamide.

7. A fluid salicylamide composition adapted to be taken orally which is substantially free of burning aftertaste comprising an aqueous suspension of solid salicylamide in which the particle size of the salicylamide is such that substantially all of it passes through a #100 mesh sieve and at least 50% thereof is retained on a #325 mesh sieve.

References Cited in the file of this patent

UNITED STATES PATENTS

| | | |
|---|---|---|
| 2,671,749 | Schultz | Mar. 9, 1954 |
| 2,818,371 | Wessinger | Dec. 31, 1957 |
| 2,904,469 | Nashed | Sept. 15, 1959 |

FOREIGN PATENTS

| | | |
|---|---|---|
| 26,913 | India | Mar. 21, 1940 |
| 455,928 | Canada | Apr. 12, 1949 |
| 680,788 | Great Britain | Oct. 8, 1952 |
| 759,577 | Great Britain | Oct. 17, 1956 |

OTHER REFERENCES

"Plasdone," PVP, Gen'l Aniline & Film Corp., N.Y.C., June 15, 1951, 22 pages, pp. 8–9 and 17–19.

Lesser: Drug and Cos. Ind., vol. 75, No. 1, July 1954, pp. 32–33 and 126–130 (reprint, 6 pp.).